United States Patent [19]

Ide

[11] Patent Number: 5,682,418

[45] Date of Patent: Oct. 28, 1997

[54] STRUCTURE FOR MOUNTING A MICROPHONE ON A PORTABLE RADIO TELEPHONE

[75] Inventor: Yoshiyuki Ide, Tokyo, Japan

[73] Assignee: NEC Corporation, Tokyo, Japan

[21] Appl. No.: 585,756

[22] Filed: Jan. 16, 1996

Related U.S. Application Data

[63] Continuation of Ser. No. 243,704, May 17, 1994, abandoned.

[30] Foreign Application Priority Data

May 18, 1993 [JP] Japan .................................. 5-139405

[51] Int. Cl.$^6$ .................................................. H04Q 7/32
[52] U.S. Cl. ................... 379/58; 379/433; 381/158; 455/89
[58] Field of Search ................... 379/58, 433; 381/158; 455/89

[56] References Cited

U.S. PATENT DOCUMENTS

| 3,995,124 | 11/1976 | Gabr ........................................ 381/158 |
| 4,354,059 | 10/1982 | Ishigaki et al. . |
| 4,937,877 | 6/1990 | Pocock et al. ........................... 381/158 |
| 5,042,071 | 8/1991 | Stinauer et al. ......................... 381/158 |
| 5,155,860 | 10/1992 | McClure .................................. 455/89 |
| 5,282,245 | 1/1994 | Anderson ................................ 379/433 |
| 5,287,554 | 2/1994 | Furuno ..................................... 455/89 |

FOREIGN PATENT DOCUMENTS

| 0414365 | 2/1991 | European Pat. Off. . |
| 0103345 | 4/1989 | Japan ....................................... 379/433 |
| 2180459 | 7/1990 | Japan . |
| 4091542 | 3/1992 | Japan . |
| 2271038 | 3/1994 | United Kingdom .................... 379/433 |
| 9222176 | 12/1992 | WIPO . |
| 4003007 | 2/1994 | WIPO ...................................... 379/433 |

*Primary Examiner*—William Cumming
*Attorney, Agent, or Firm*—Whitham, Curtis, Whitham & McGinn

[57] ABSTRACT

In a portable radio telephone powered by a removable rechargeable battery, a differential microphone having a first and a second microphone element is mounted. A front sound collecting hole is formed in the front of the casing of the telephone and includes the first microphone element. The front sound collecting hole constitutes a transmitter portion. A rear sound collecting hole is formed in a portion of the battery directly opposite in position to the front sound collecting hole. The rear hole is communicated by a passageway to a rear sound collecting portion included in the differential microphone. Speech and noise around the telephone are input to the front hole while only noise, which is opposite in phase to the noise input to the front hole, is input to the rear hole. As a result, the noise input to the front and rear holes cancel each other. The rear hole is formed in a portion of the battery where a space is present. When the rear hole is directly formed in a generating member included in the battery, the inner periphery of the generating member defining the hole is covered with a member made of resin. If desired, the rear hole may be implemented by a through hole, in which case the differential microphone will be inserted in the through hole.

16 Claims, 4 Drawing Sheets

STRUCTURE FOR MOUNTING A MICROPHONE ON A PORTABLE RADIO TELEPHONE

This is a Continuation of application Ser. No. 08/243,704 filed May 17, 1994, now abandoned.

The power of attorney appears in the original papers of the prior application. Priority is claimed from May 18, 1993 based on Japanese Patent Application No. 139405/93. The priority document was filed in the parent Application No. 08/243,704.

BACKGROUND OF THE INVENTION

The present invention relates to a structure for mounting a microphone on a portable radio telephone and, more particularly, to a structure for mounting a differential microphone on a portable radio telephone with a rechargeable battery.

Since a portable radio telephone is, in many cases, used outdoors, speech seriously suffers from noise around the telephone. A conventional telephone of this kind has not been provided with a measure against such noise and has forced the user of the telephone to withstand the deterioration of speech.

A differential microphone is a state-of-the-art development capable of reducing surrounding noise. A differential microphone consists of two microphone elements, i.e., a first element positioned to catch both speech and noise, and a second element positioned to catch only noise. This type of microphone suppresses surrounding noise by using a difference in sound pressure between speech input to the first microphone element and noise input to the second microphone element.

Today, a portable radio telephone rechargeable battery is available in various forms. Generally, the rechargeable battery is removably mounted on the rear of the telephone.

SUMMARY OF THE INVENTION

It is an object of the present invention to provide a new and useful structure which allows a differential microphone to be mounted on a portable radio telephone with a rechargeable battery, in order to prevent speech from being deteriorated by surrounding noise.

In order to achieve the above object, a microphone mounting structure for a portable radio telephone of the present invention comprises a receiver portion, a button or operating section on the front thereof and a rechargeable battery removably mounted on the rear thereof.

The structure also has a transmitter portion implemented by a front sound collecting hole. A differential microphone has a first microphone element disposed in the front sound collecting hole; speech and noise at the front are input to the microphone element. A rear sound collecting hole for collecting sound at the sides and rear is implemented by a space available in a generating member included in the battery. The rear sound collecting hole and a rear sound collecting portion, which comprises a second microphone element of the differential microphone, are connected by a linear passageway.

A through hole, or rear sound collecting hole, is implemented by a space available in the battery below the generating member. The rear sound collecting hole is connected to the rear sound collecting portion by a non-linear passageway.

Further, the rear sound collecting hole is directly formed in the generating member of the battery. The inner periphery of the generating member defining the hole is covered with resin.

BRIEF DESCRIPTION OF THE DRAWINGS

The above and other objects, features and advantages of the present invention will become more apparent from the following detailed description taken with the accompanying drawings in which.

In the figures, the same or similar constituent parts are designated by the same reference numerals.

DESCRIPTION OF THE PREFERRED EMBODIMENTS

Figure 1:
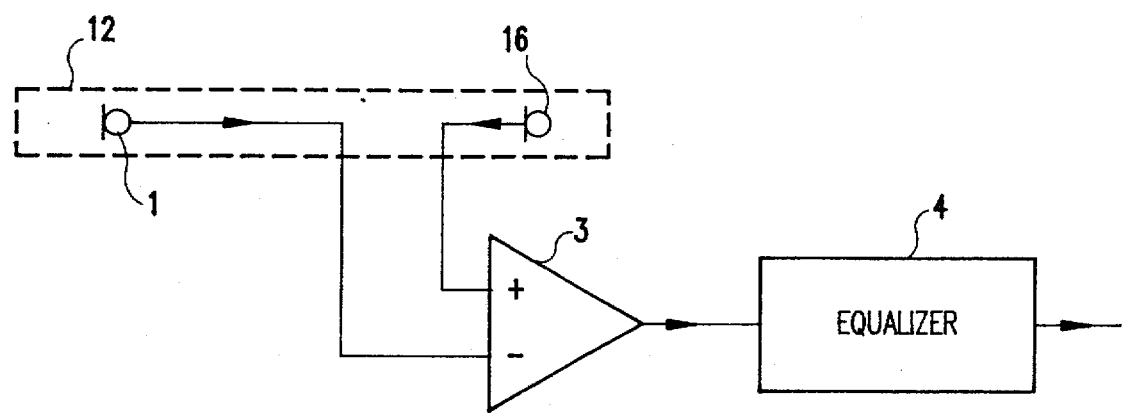
FIG. 1 is a block diagram schematically showing a voice reduction circuit including a differential microphone with which the present invention can be used.

Referring to FIG. 1 of the drawings, a noise reduction circuit in accordance with the present invention is shown applied to a differential microphone. As shown, a differential microphone 12 has a first and a second microphone element 1 and 16, respectively. Speech, including surrounding noise, are input to the first microphone element 1 via a hole, not shown, which is formed in the front of the microphone. The other microphone element 16 is connected by a passageway to a hole, not shown, formed in the rear of the microphone 12 so as to play the role of a rear sound collecting portion. Surrounding noise is input to the second microphone element 16 from the rear and sides of the microphone 12. A subtractor 3 performs subtraction of the input signals from the microphone elements 1 and 16, thereby outputting a speech signal in which surrounding noise is suppressed. An equalizer 4 receives the speech signal from the subtractor 3 and flattens it within a speech band.

Figure 2:
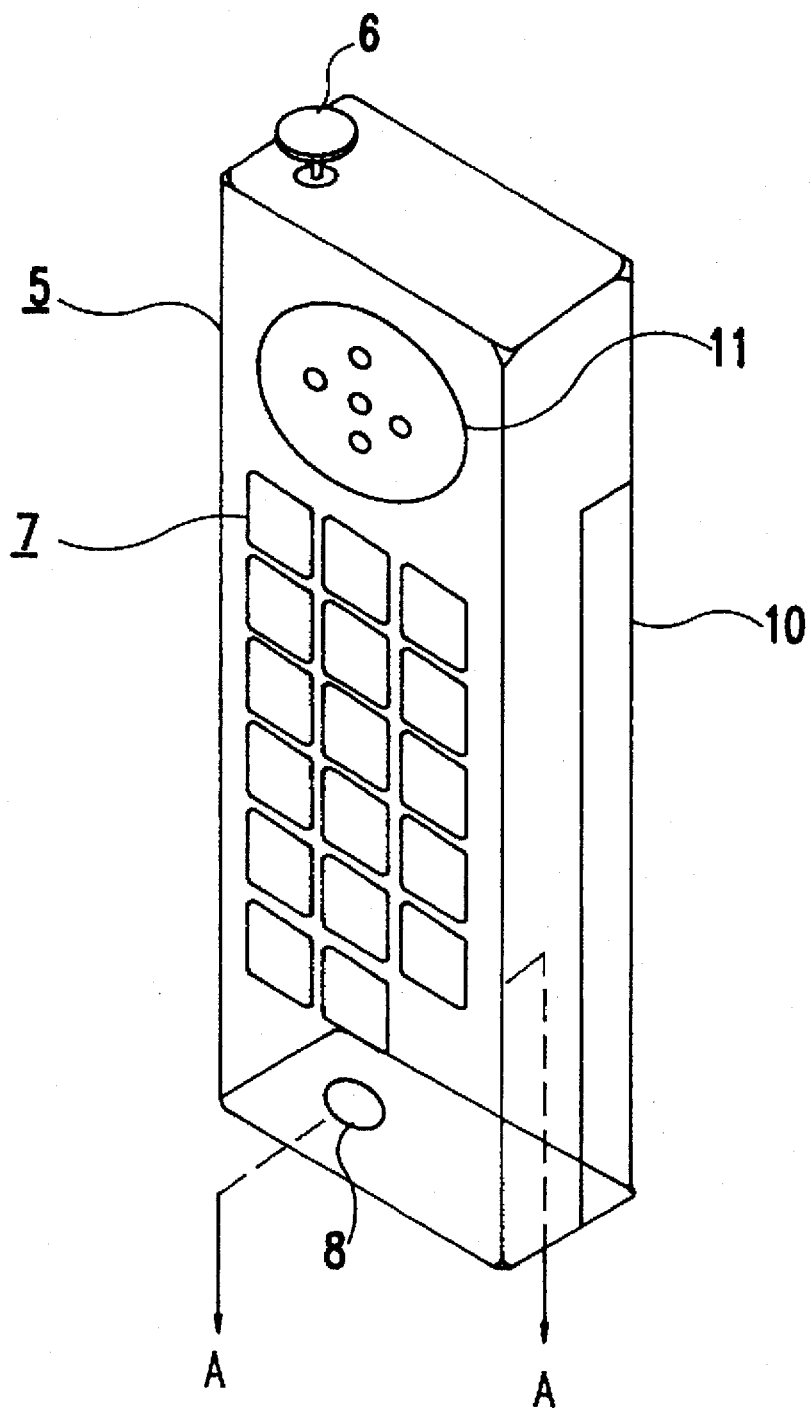
FIG. 2 is a perspective view of a first embodiment of the structure in accordance with the present invention.

FIG. 2 shows a first embodiment of the microphone mounting structure in accordance with the present invention. As shown, a portable radio telephone has a casing 5. Numeral keys and function keys, generally 7, and a receiver portion 11 are arranged on the front of the casing 5. A whip antenna 6 is retractably mounted on the top of the casing 5. A sound collecting hole 8 is formed through a lower portion of the front of the casing 5, constituting a transmitter portion. The first microphone element 1 of the differential microphone 12, FIG. 1, is disposed in the hole 8. Speech and noise input to the hole 8 are output to the microphone element 1. A rechargeable battery 10 is removably mounted on the rear of the telephone.

Figure 3:
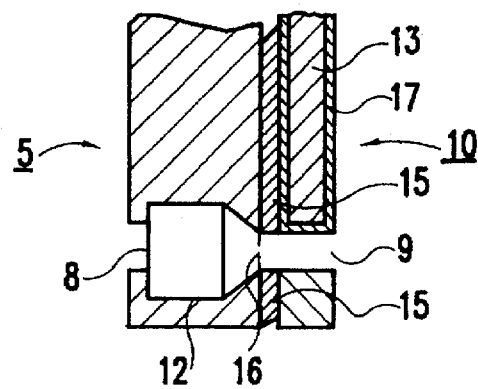
FIG. 3 is a section along line A—A of FIG. 2.

As shown in FIG. 3, the battery 10 has a generating member 13 implemented by NiCd (Nickel-Cadmium) and covered with a member 17 made of resin. Also, the battery 10 has a space in a lower portion thereof where the generating member 13 is absent. A part of this space of the battery 10 forms a rear sound collecting hole 9, as distinguished from the front sound collecting hole 8. The microphone 12 includes the front hole 8 and a second microphone element (as a rear sound collecting portion) 16 which is directly communicated to the rear hole 9 by a passageway. A rubber packing 15 is interposed between the battery 10 and the telephone casing 5 to prevent surrounding noise input to the rear hole 9 from leaking through the gap between them. The diameter of the rear hole 9 is determined by the frequency bandwidth of surrounding noise to be suppressed. In the illustrative embodiment, the rear hole 9 is positioned just behind (i.e., directly opposite to) the front hole 8, promoting extremely easy layout.

The operation of the embodiment will be described hereinafter. The battery 10 is removed from the telephone casing 5 in the event of charging, and then attached to the casing 5 after charging. When a conversation is held on the telephone, a speech signal and noise are input via the front hole, or transmitter portion, 8. At the same time, noise at the rear and sides of the telephone are input to the second microphone element (as a rear sound collecting portion) 16 via the rear hole 9. Since the rear hole 9 is located directly opposite to the front hole 8, the noise input to the former is opposite in phase to the noise input to the latter. As a result, noise around the telephone is fully canceled by the differential microphone circuit 12 shown in FIG. 1.

Figure 4:
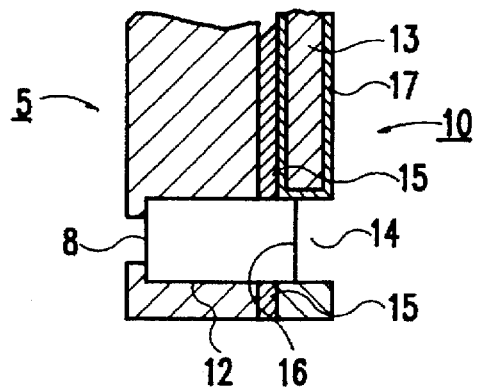
FIGS. 4 through 6 are sections respectively showing a second to a fourth embodiment of the present invention.

Referring to FIG. 4, a second embodiment of the present invention will be described. As shown, a differential microphone 12 may have a greater dimension than the differential microphone of FIG. 3, as measured in the depthwise direction. A hole 14 is formed throughout a portion of the battery 10 below the generating member 13, i.e., in the previously mentioned space. The through hole 14, like the rear hole 9 shown in FIG. 3, collects surrounding noise from the rear and sides of the telephone. Again, the rubber packing 15 is disposed between the telephone casing 5 and the battery 10 to prevent noise coming in through the hole 14 from leaking through the gap between them. The microphone 12 is disposed in the hole 14 with the front hole 8 thereof located at the front of the telephone casing 5. Since the through hole 14 is located directly opposite to the front hole 8, the noise input to the through hole 14 is opposite in phase to the noise input to the front hole 8. As a result, noise around the telephone is fully canceled, as in the first embodiment.

Figure 5:
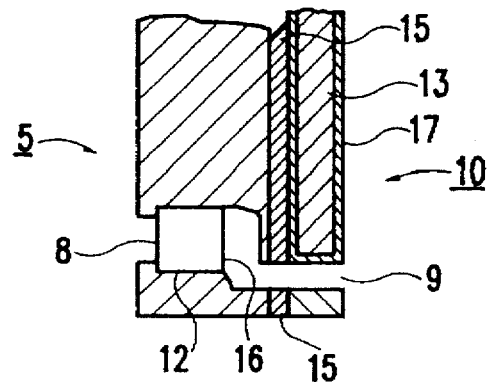

FIG. 5 shows a third embodiment of the present invention. As shown, the passageway communicating the rear hole 9 to the second microphone element (as a rear sound collecting portion) 16 is not linear, but it is bent downward in the form of a letter L. When the generating member 13 has to be located just behind the front hole 8 for a layout or similar reason, then, the rear hole 9 should be positioned just behind the front hole 8, i.e., within the generating member 13. The generating member 13 would appear at the inner periphery of the rear hole 9. The third embodiment is advantageously applicable to such a situation. If desired, the rear hole 9 may be similarly formed by a space at the right, left or top of the battery 10 where the generating member 13 is absent, so long as the rear hole 9 communicates with the second microphone element (as a rear sound collecting portion) 16 by a non-linear passageway. In this embodiment or the modification thereof, it is impossible to position the rear hole 9 just behind the front hole 8, and therefore, noise input to the hole 8 and noise input to the hole 9 are not completely out of phase with each other. However, the noise reduction effect is rather enhanced since the rear hole 9 is farther from the front hole 8 than in the previous 5 embodiments.

Figure 6:
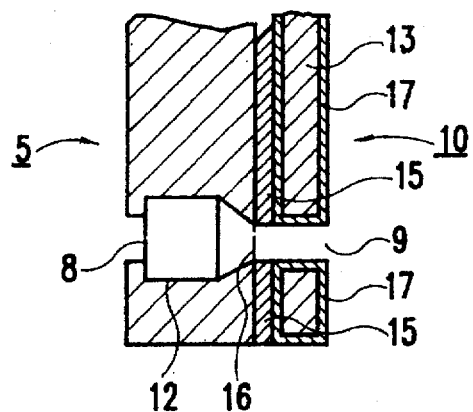
Figure 7:
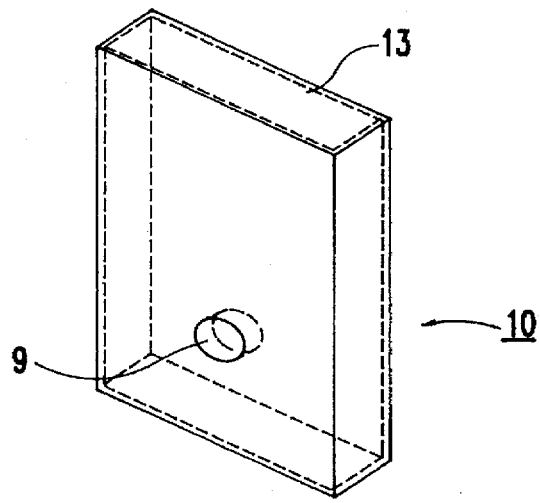
FIG. 7 is a perspective view of a rechargeable battery included in the fourth embodiment.

A reference will be made to FIG. 6 for describing a fourth embodiment of the present invention advantageously applicable to a case wherein no space is available in the battery 10. As shown, this embodiment is identical to the first embodiment except that the rear hole 9 is formed in the generating member 13. In this embodiment, the inner periphery of the generating member 13 defining the rear hole 9 is covered with a member 17 made of resin and, therefore, is not exposed to the outside. This is successful in preserving the generating member 13 despite the presence of the hole 9. This kind of configuration allows a large size generating member 13, which occupies the entire space of the battery 10, to be used in order to increase the battery capacity. In addition, the position of the rear hole 9 can be selected more freely than in the previous embodiments. FIG. 7 shows the battery 10 in a perspective view. As shown, the rear hole 9 is formed throughout the generating member 13 and provided with a circular cross-section.

Figure 8:
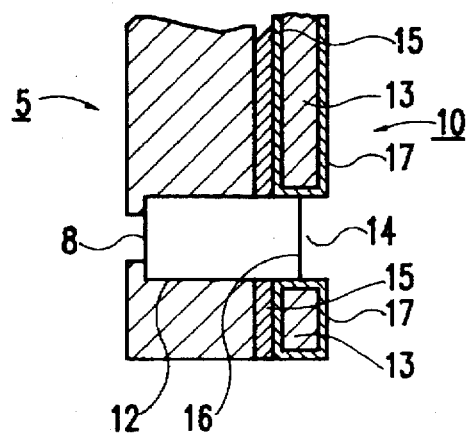
FIG. 8 is a section of a fifth embodiment of the present invention.

FIG. 8 shows a fifth embodiment of the present invention which is similar to the second embodiment of FIG. 4 except that the rear hole 9 is formed in the generating member 13. In this embodiment, as in the embodiment of FIG. 6, the inner periphery of the generating member 13 defining the rear hole 9 is covered with the resinous member 17 for protection.

In summary, the present invention provides a structure which allows a differential microphone to be mounted on a portable radio telephone and locates a rear sound collecting hole of the microphone just behind a front sound collecting hole or transmitter portion. The structure, therefore, suppresses surrounding noise effectively. When the rear hole is connected to a rear sound collecting portion by a non-linear path or when the rear hole is directly formed in a generating member included in a rechargeable battery, it can be located at any desired position of the battery.

Various modifications will become possible for those skilled in the art after receiving the teachings of the present disclosure without departing from the scope thereof.

I claim:

1. A structure for mounting a microphone on a portable radio telephone having a casing, comprising:

an operating section comprising numeral keys and function keys;

a rechargeable battery removably mounted on a rear of said casing of the telephone and said battery having a hole formed therethrough, said battery including an outer covering, a generating member within said outer covering and a space within said outer covering, a first section of said generating member being positioned on a first side of said hole and a second section of said generating member being positioned on a second side of said hole opposite said first side and said space being positioned between said first section and said second section of said generating member and adjacent said hole;

a differential microphone including a first microphone element and a second microphone element;

a front sound collecting hole comprising a transmitter portion for transmitting sound to said first microphone element of said differential microphone;

a rear sound collecting hole formed in said hole in said battery and directly opposite in position to said front sound collecting hole;

a passageway for connecting said rear sound collecting hole and a rear sound collecting portion which is formed by said second microphone element of said differential microphone;

a rubber packing interposed between said battery and said casing; and a circuit connected to said differential microphone, for suppressing surrounding noise, comprising a subtractor for receiving output signals of said first and second microphone elements and an equalizer for receiving an output of said subtractor.

2. A structure as claimed in claim 1, wherein said differential microphone is positioned between said rear sound collecting hole formed in said battery and said front sound collecting hole.

3. A structure for mounting a microphone on a portable radio telephone having a casing, comprising:

an operating section comprising numeral keys and function keys;

a rechargeable battery removably mounted on a rear of said casing of the telephone and said battery having a hole formed therethrough, said battery including an outer covering, a generating member within said outer covering and a space within said outer covering, a first section of said generating member being positioned on a first side of said hole and a second section of said generating member being positioned on a second side of said hole opposite said first side and said space being positioned between said first section and said second section of said generating member and adjacent said hole;

a differential microphone including a first microphone element;

a front sound collecting hole comprising a transmitter portion for transmitting sound to said first microphone element of said differential microphone;

a rear sound collecting hole formed in said hole through said battery;

a non-linear passageway for connecting said front and rear sound collecting holes;

a rubber packing interposed between said battery and said casing; and a circuit connected to said differential microphone, for suppressing surrounding noise, comprising a subtractor for receiving output signals of said first and second microphone elements and an equalizer for receiving an output of said subtractor.

4. A structure for mounting a microphone on a portable radio telephone having a casing, comprising:

an operating section comprising numeral keys and function keys;

a rechargeable battery removably mounted on a rear of said casing of the telephone comprising a generating member having a hole formed therethrough, said battery including an outer covering, a generating member within said outer covering and a space within said outer covering, a first section of said generating member being positioned on a first side of said hole and a second section of said generating member being positioned on a second side of said hole opposite said first side and said space being positioned between said first section and said second section of said generating member and adjacent said hole;

a differential microphone including a first microphone element and a second microphone element;

a front sound collecting hole comprising a transmitter portion for transmitting sound to said first microphone element of said differential microphone;

a rear sound collecting hole formed in said hole through said generating member of said battery and directly opposite in position to said front sound collecting hole;

a member comprising resin for covering an inner periphery of said hole through said generating member;

a passageway for connecting said front and rear sound collecting holes;

a rubber packing interposed between said battery and said casing; and a circuit connected to said differential microphone, for suppressing surrounding noise, comprising a subtractor for receiving output signals of said first and second microphone elements and an equalizer for receiving an output of said subtractor.

5. A structure as claimed in claim 4, wherein said differential microphone is positioned between said rear sound collecting hole formed in said battery and said front sound collecting hole.

6. A structure for mounting a microphone on portable electronic equipment having a body, comprising:

a rechargeable battery removably mounted on a rear of said body and said battery having a hole therethrough, said battery including an outer covering, a generating member within said outer covering and a space within said outer covering, a first section of said generating member being positioned on a first side of said hole and a second section of said generating member being positioned on a second side of said hole opposite said first side and said space being positioned between said first section and said second section of said generating member and adjacent said hole;

a differential microphone including a first microphone element and a second microphone element;

a front sound collecting hole for inputting sound from the front of said body into said differential microphone;

a rear sound collecting hole formed in said hole through said battery for inputting sound from the rear of said body into said differential microphone; and a circuit connected to said differential microphone, for suppressing surrounding noise, comprising a subtracter for receiving output signals of said first and second microphone elements and an equalizer for receiving an output of said subtractor.

7. A structure as claimed in claim 6, wherein said differential microphone is positioned between said rear sound collecting hole which is formed in said battery and said front sound collecting hole.

8. A structure as claimed in claim 7, wherein said rear sound collecting hole is formed in a portion of said battery where a space is present and directly opposite in position to said front sound collecting hole.

9. A structure as claimed in claim 6, wherein said front and rear sound collecting holes are connected by a linear passageway.

10. A structure as claimed in claim 6, wherein said front and rear sound collecting holes are connected by a non-linear passageway.

11. A structure for mounting a microphone on portable electronic equipment having a body, comprising:

a rechargeable battery removably mounted on a rear of said body comprising a generating member having a hole formed therethrough, said battery including an outer covering, a generating member within said outer covering and a space within said outer covering, a first section of said generating member being positioned on a first side of said hole and a second section of said generating member being positioned on a second side of said hole opposite said first side and said space being positioned between said first section and said second section of said generating member and adjacent said hole;

a differential microphone including a first microphone element and a second microphone element;

a front sound collecting hole for inputting sound from a front of said body into said differential microphone;

a rear sound collecting hole formed in said hole through said generating member of said battery for inputting sound from a rear of said body into said differential microphone;

a member comprising resin for covering an inner periphery of said hole through said generating member; and a circuit connected to said differential microphone, for suppressing surrounding noise, comprising a subtractor for receiving output signals of said first and second microphone elements and an equalizer for receiving an output of said subtractor.

12. A structure as claimed in claim 11, wherein said differential microphone is located between said rear sound collecting hole which is formed in said battery and said front sound collecting hole.

13. A structure as in claim 1, wherein said passageway has an L-shape.

14. A structure as in claim 1, wherein said differential microphone is positioned between said rear sound collecting hole formed in said battery and said front sound collecting hole.

15. A structure as in claim 8, wherein said front and rear sound collecting holes are connected by a linear passageway.

16. A structure as in claim 8, wherein said front and rear sound collecting holes are connected by a non-linear passageway.

* * * * *